United States Patent [19]

Lupton

[11] Patent Number: 4,507,347
[45] Date of Patent: Mar. 26, 1985

[54] LAMINATE

[76] Inventor: Donald B. Lupton, The Boat House, Slipper Hill, Foulbridge, Colne, Lancashire, England

[21] Appl. No.: 476,500

[22] Filed: Mar. 18, 1983

[30] Foreign Application Priority Data

Mar. 31, 1982 [GB] United Kingdom ............... 8209570

[51] Int. Cl.³ .............................................. B32B 3/00
[52] U.S. Cl. .................................... 428/166; 156/219; 428/182; 428/246; 428/247; 428/251; 428/906
[58] Field of Search ............... 428/247, 255, 182, 187, 428/166, 178, 906, 246, 251; 156/219

[56] References Cited

U.S. PATENT DOCUMENTS 4,089,783  5/1978  Holyoak ............................ 428/247
4,170,675 10/1979  Greengrass ...................... 428/247

Primary Examiner—James J. Bell
Attorney, Agent, or Firm—Norbert P. Holler; Bert J. Lewen

[57] ABSTRACT

A laminate useful in roofing and wall cladding applications is of two or more layers and comprises a decorative element 12, an optional strength giving element 16, a vapor barrier element 14 and an anti-wrinkle element 18. The latter is preferably a corrugated PVC sheet.

9 Claims, 1 Drawing Figure

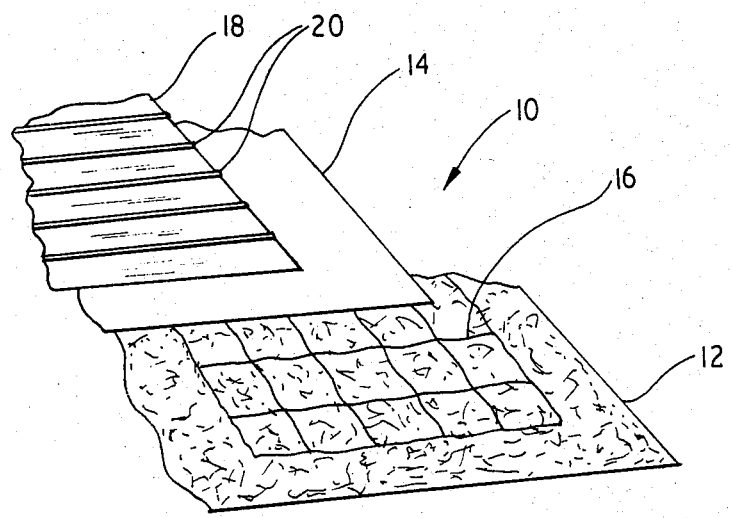

ated product for use in industrial roofing applications which comprises a fibreglass scrim laminated between an aluminium foil and a layer of vinyl plastics material. This laminate is used as follows. A glass-fibre bat is adhered to the aluminium side of the laminate and the whole is stretched over the roof structural members of, for example, a warehouse or factory building, with the vinyl face showing downwardly into the interior of the building. Roofing panels are then placed over the fibre-glass and are bolted to the structural members through the laminate. The laminate thus provides a degree of heat insulation, owing to the glass-fibre layer, and the plastics material surface thereof is decorative and provides the internal finish or ceiling of the building.

LAMINATE

This invention relates to a laminate and in particular relates to a laminate for use in roofing and wall cladding applications.

There is available a laminated product for use in industrial roofing applications which comprises a fibreglass scrim laminated between an aluminium foil and a layer of vinyl plastics material. This laminate is used as follows. A glass-fibre bat is adhered to the aluminium side of the laminate and the whole is stretched over the roof structural members of, for example, a warehouse or factory building, with the vinyl face showing downwardly into the interior of the building. Roofing panels are then placed over the fibre-glass and are bolted to the structural members through the laminate. The laminate thus provides a degree of heat insulation, owing to the glass-fibre layer, and the plastics material surface thereof is decorative and provides the internal finish or ceiling of the building.

While the above mentioned laminated material is convenient and inexpensive in these applications one problem has arisen in its use which is difficult to solve. When the laminate material is placed over the structural roof members, for example steel girders supporting the roof, and fixed in place, it tends to wrinkle. Such wrinkles give an unsightly appearance to the ceiling so made, and this has prevented as widespread use as might have been expected of this product.

The invention seeks to provide a laminated product which overcomes or reduces the above disadvantages.

According to the present invention there is provided a laminate for use as a building material which comprises at least two separate layers laminated together having the following elements:

a decorative element forming one surface of the laminate which will be visible in use;

an optional strength giving element to prevent stretching of the laminate under tensile forces;

a vapour barrier element to prevent the passage of water vapour through the laminate; and an anti-wrinkle element of sufficient flectural stiffness to prevent wrinkling and of sufficient flexibility to allow the laminate to be rolled up for storage and transport.

The anti wrinkle element may be corrugated plastics material or metal sheet, e.g. a corrugated PVC or an aluminium foil sheet, or may comprise thin strips or rods of metal or plastics material attached to one of the other elements in spaced parallel arrangement. The corrugations or strips give dimensional stability in the direction of their long axes, yet allow the laminate to be rolled up in a direction normal to their axes.

The four elements making up the laminate of the invention can be provided by separate sheets or layers material or two or more of these elements may be present in a single sheet material forming one layer of the laminate.

Thus, in one embodiment of the invention the decorative element may be an opaque embossed vinyl plastics material, the strength giving element may be a woven glass-fibre scrim, the vapour barrier element may be an aluminium foil, and the anti-wrinkle element may be a corrugated stiff plastics material sheet, such as a corrugated PVC sheet. In another embodiment the decorative element and the anti-wrinkle element may be combined in a single layer which is both of pleasing appearance and sufficiently stiff to prevent unwanted wrinkling in use. Furthermore, the vapour barrier element may comprise an aluminium foil or a vapour impermeable plastics material, such as polyethylene. This in turn may have decorative or anti-wrinkle properties. The strength giving element will generally be a glass-fibre scrim but, where a sufficiently tough and durable plastics materials sheet is used for the decorative and/or anti-wrinkle element, this may be omitted.

In order to transport and conveniently use a laminate in accordance with the invention it is essential that, while the anti-wrinkle element gives sufficient resistance to wrinkling in use, it should not be so stiff as to prevent the laminate being rolled up for storage transportation and use. Thus, the preferred anti-wrinkle element in accordance with the invention is a corrugated plastic material or metal sheet, the corrugation giving the sheet sufficient resilience to enable the desired rolls of material to be produced while at the same time giving sufficient lateral rigidity to prevent wrinkling.

The invention also provides a method of forming a laminate which comprises taking a relatively stiff plastics material sheet, embossing corrugations therein, and forming a laminate of the sheet with one or more additional layers to provide a laminate having a decorative element, a strength giving element, a vapour barrier element and an anti-wrinkle element.

The invention will be described further, by way of example, with reference to the accompanying drawing, in which the sole FIGURE is a diagrammatic exploded view of a laminate constructed in accordance with the invention.

Referring to the drawing, a laminate generally designated 10 comprises a decorative sheet of soft vinyl material 12 having a pleasing pattern produced or embossed therein. The vinyl material 12 is opaque and self-coloured, and provides the visible surface of the building ceiling. A vapour barrier element may comprise an aluminium foil 14 which is laminated to the vinyl sheet 12 and also, if one is confined between the elements 12 and 14, to a strength giving element such as a glass-fibre woven scrim 16. Adhered to the aluminium foil 14 is an anti-wrinkle element which comprises a corrugated PVC sheet 18, the corrugations 20 of which run generally transverse of the length of the laminate, enabling the latter to be rolled up into a convenient roll.

The laminate may be produced with the aid of any suitable adhesive, for example a hot melt adhesive or an isocyanurate cold setting adhesive. Where plastic material other than PVC are employed, solvent based adhesives may be used.

In use, a glass-fibre bat will generally be preadhered to a portion of the laminate, on the side remote from the decorative face of the sheet of vinyl material constituting the decorative element 12. That is, the bat will be adhered in the embodiment shown to the corrugated PVC sheet 18. The glass-fibre bat may be attached with a suitable adhesive, for example polyvinyl alcohol adhesive.

The sheet 18 is produced by taking a plain transparent sheet of PVC material of the required stiffness and passing it through the nip of the heated embossing roll to produce the corrugation 20 therein. The latter gives the finished laminate lateral stiffness while enabling it to be rolled up into a convenient roll for storage and transportation.

While anti-wrinkle elements of other stiffness characteristics may be useful in the practice of the present invention, it has been found that materials having a stiffness within the range determined in the following manner are especially useful. A 1 inch wide strip of the material supported between two points 24 inches apart should be sufficiently stiff to be self-supporting, and at the same time the material should be sufficiently resilient so that the same strip can be rolled up into a roll of 2 inches in diameter.

I claim:

1. A laminate for use as a building material which comprises at least three separate layers laminated together and comprising the following elements: an opaque embossed vinyl plastics material sheet constituting a decorative element forming one surface of the laminate which will be visible in use; a vapour barrier element to prevent the passage of water vapour through the laminate; and an anti-wrinkle element of sufficient flexural stiffness to prevent wrinkling of the laminate and of sufficient flexibility to allow the laminate to be rolled up for storage and transport.

3. A laminate according to claim 1 in which two or more of the elements are represented by a single sheet of material forming one layer of the laminate.

4. A laminate according to claim 1 in which the vapour barrier element is an aluminium foil.

5. A laminate according to claim 1 in which the anti-wrinkle element is a corrugated stiff plastics material or metal sheet.

6. A laminate according to claim 5 in which the plastics material is a corrugated PVC sheet.

7. A laminate according to claim 1 which includes a strength element to prevent stretching of the laminate under tensile forces.

8. A laminate according to claim 7 in which the strength element is a glass-fibre scrim.

9. A method of forming a laminate which comprises the steps of taking a relatively sheet and embossing

UNITED STATES PATENT AND TRADEMARK OFFICE
CERTIFICATE OF CORRECTION

PATENT NO. : 4,507,347

DATED : Mar. 26, 1985

INVENTOR(S) : Donald B. Lupton

It is certified that error appears in the above-identified patent and that said Letters Patent is hereby corrected as shown below:

On the cover page of the patent, col. 1,
after the fourth line, insert the following:

[73] Assignee: P. H. Insulation Materials Limited, England

Signed and Sealed this

Twenty-fourth Day of December 1985

[SEAL]

Attest:

DONALD J. QUIGG

Attesting Officer

Commissioner of Patents and Trademarks